(12) United States Patent
Park et al.

(10) Patent No.: US 11,558,883 B2
(45) Date of Patent: Jan. 17, 2023

(54) METHOD FOR TRANSMITTING AND RECEIVING SIGNAL BY TERMINAL IN WIRELESS COMMUNICATION SYSTEM

(71) Applicant: LG Electronics Inc., Seoul (KR)

(72) Inventors: Giwon Park, Seoul (KR); Seoyoung Back, Seoul (KR); Daesung Hwang, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/665,136

(22) Filed: Feb. 4, 2022

(65) Prior Publication Data

US 2022/0159679 A1 May 19, 2022

Related U.S. Application Data

(63) Continuation of application No. PCT/KR2021/000196, filed on Jan. 7, 2021.

(30) Foreign Application Priority Data

Jan. 7, 2020 (KR) .................. 10-2020-0002197

(51) Int. Cl.
*H04W 72/12* (2009.01)
*H04W 4/46* (2018.01)
(Continued)

(52) U.S. Cl.
CPC ......... *H04W 72/1263* (2013.01); *H04W 4/06* (2013.01); *H04W 4/40* (2018.02); *H04W 4/46* (2018.02); *H04W 92/18* (2013.01)

(58) Field of Classification Search
CPC . H04W 36/0009; H04W 72/04; H04W 76/14; H04W 72/14
See application file for complete search history.

(56) References Cited

U.S. PATENT DOCUMENTS

2019/0174411 A1 6/2019 Xu et al.
2021/0045093 A1* 2/2021 Rao .................. H04W 72/04
(Continued)

FOREIGN PATENT DOCUMENTS

CN 105379406 3/2016
KR 20190039101 4/2019
(Continued)

OTHER PUBLICATIONS

3GPP, "3rd Generation Partnership Project; Technical Specification Group Services and System Aspects; Architecture enhancements for 5G System (5GS) to support Vehicle-to-Everything (V2X) services (Release 16)," TS 23.287 V16.1.0, Dec. 2019, 51 pages.
(Continued)

*Primary Examiner* — Khalid W Shaheed
(74) *Attorney, Agent, or Firm* — Fish & Richardson P.C.

(57) ABSTRACT

An embodiment relates to a method for a first terminal operating in a wireless communication system, the method comprising the steps of: transmitting application information from an application layer to a vehicle-to-everything (V2X) layer; generating, in the V2X layer, sidelink (SL) discontinuous reception (DRX) information on the basis of the application information; transmitting the SL DRX information from the V2X layer to an AS layer; and communicating with a second terminal by applying the SL DRX information in the AS layer, wherein the application information includes at least one application requirement.

12 Claims, 23 Drawing Sheets

(51) Int. Cl.
    *H04W 4/06*         (2009.01)
    *H04W 4/40*         (2018.01)
    *H04W 92/18*       (2009.01)

(56) References Cited

U.S. PATENT DOCUMENTS

2021/0306948 A1*   9/2021   Ding ................... H04L 1/1812
2021/0400448 A1*  12/2021   Adjakple ............... H04W 4/40

FOREIGN PATENT DOCUMENTS

| WO | WO2018016882 | 1/2018 |
| WO | WO2018064477 | 4/2018 |

OTHER PUBLICATIONS

International Search Report in International Appln. No. PCT/KR2021/000196, dated Apr. 20, 2021, 5 pages (with English translation).
Vivo, "Views on NR sidelink enhancements in Rel-17," RP-191896, Presented at 3GPP TSG RAN Meeting #85, Newport Beach, USA, Sep. 16-20, 2019, 5 pages.
Extended European Search Report in European Appln. No. 21738773.7, dated Oct. 10, 2022, 9 pages.
Qualcomm Incorporated & LG Electronics, "Support of PC5 transmission mechanism selection using Tx Profile," S2-185771 (revision of S2-185693), Presented at 3GPP TSG-SA WG2 Meeting #127␣IS, May 28-Jun. 1, 2018, Newport Beach, California, USA, 4 pages.

* cited by examiner

● : Transmitting UE
◎ : Receiving UE

METHOD FOR TRANSMITTING AND RECEIVING SIGNAL BY TERMINAL IN WIRELESS COMMUNICATION SYSTEM

CROSS-REFERENCE TO RELATED APPLICATIONS

This application is a continuation of International Application No. PCT/KR2021/000196, filed on Jan. 7, 2021, which claims the benefit of Korean Application No. 10-2020-0002197, filed on Jan. 7, 2020. The disclosures of the prior applications are incorporated by reference in their entirety.

TECHNICAL FIELD

The following description relates to a wireless communication system, and more particularly, to a method and apparatus for configuring a sidelink (SL) discontinuous reception (DRX) configuration by a user equipment (UE).

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

Embodiment(s) is intended to provide a method of generating a sidelink (SL) discontinuous reception (DRX) configuration in consideration of service requirements by a user equipment (UE).

It will be appreciated by persons skilled in the art that the objects that could be achieved with the present disclosure are not limited to what has been particularly described hereinabove and the above and other objects that the present disclosure could achieve will be more clearly understood from the following detailed description.

An embodiment is a method for a first user equipment (UE) operating in a wireless communication system, including transmitting application information from an application layer to a vehicle-to-everything (V2X) layer, generating sidelink (SL) discontinuous reception (DRX) information based on the application information in the V2X layer, transmitting the SL DRX information from the V2X layer to an access stratum (AS) layer, and communicating with a second UE by applying the SL DRX information in the AS layer. The application information includes at least one application requirement.

An embodiment is a first UE in a wireless communication system, including at least one processor, and at least one computer memory operably coupled to the at least one processor and storing instructions which when executed, cause the at least one processor to perform operations. The operations include transmitting application information from an application layer to a V2X layer, generating SL DRX information based on the application information in the V2X layer, transmitting the SL DRX information from the V2X layer to an AS layer, and communicating with a second UE by applying the SL DRX information in the AS layer. The application information includes at least one application requirement.

An embodiment is a computer-readable storage medium storing instructions which when executed, cause at least one processor to perform operations for a UE. The operations include transmitting application information from an application layer to a V2X layer, generating SL DRX information based on the application information in the V2X layer, transmitting the SL DRX information from the V2X layer to an AS layer, and communicating with a second UE by applying the SL DRX information in the AS layer. The application information includes at least one application requirement.

The application information may further include information about at least one service type.

The SL DRX information may include at least one of SL drx-onDurationTimer, SL drx-SlotOffset, SL drx-InactivityTimer, SL drx-RetransmissionTimer, SL drx-LongCycleStartOffset, SL drx-ShortCycle, SL drx-ShortCycleTimer, or SL drx-HARQ-RTT-Timer.

The SL DRX information may be broadcast to other UEs which are not connected to the first UE.

The SL DRX information may be transmitted to the second UE through a physical sidelink broadcast channel (PSBCH).

The SL DRX information may be transmitted to the second UE through second sidelink control information (SCI).

First SCI may include an indicator indicating whether the SL DRX information is included in the second SCI.

When a part of the SL DRX information is included in the second SCI, remaining SL DRX information may be transmitted to the second UE through a physical sidelink shared channel (PSSCH).

The second SCI may include an indicator indicating whether the remaining SL DRX information is included in the PSSCH.

The SL DRX information may be transmitted to the second UE through a PSSCH.

The first UE may communicate with at least one of another UE, a UE related to an autonomous driving vehicle, a base station, or a network.

According to an embodiment, a user equipment (UE) may generate a sidelink (SL) discontinuous reception (DRX) configuration in consideration of service requirements at a vehicle-to-everything (V2X) layer, without signaling with a base station (BS).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, provide embodiments of the present disclosure together with detail explanation.

DETAILED DESCRIPTION

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B"

may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
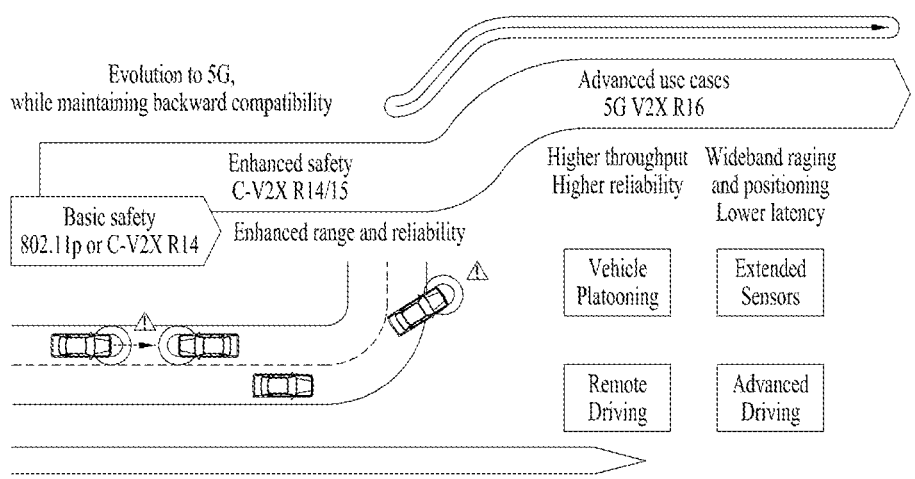
FIG. 1 is a diagram illustrating vehicle-to-everything (V2X) communication based on pre-new radio access technology (NR) RAT and V2X communication based on NR in comparison.
Figure 2:
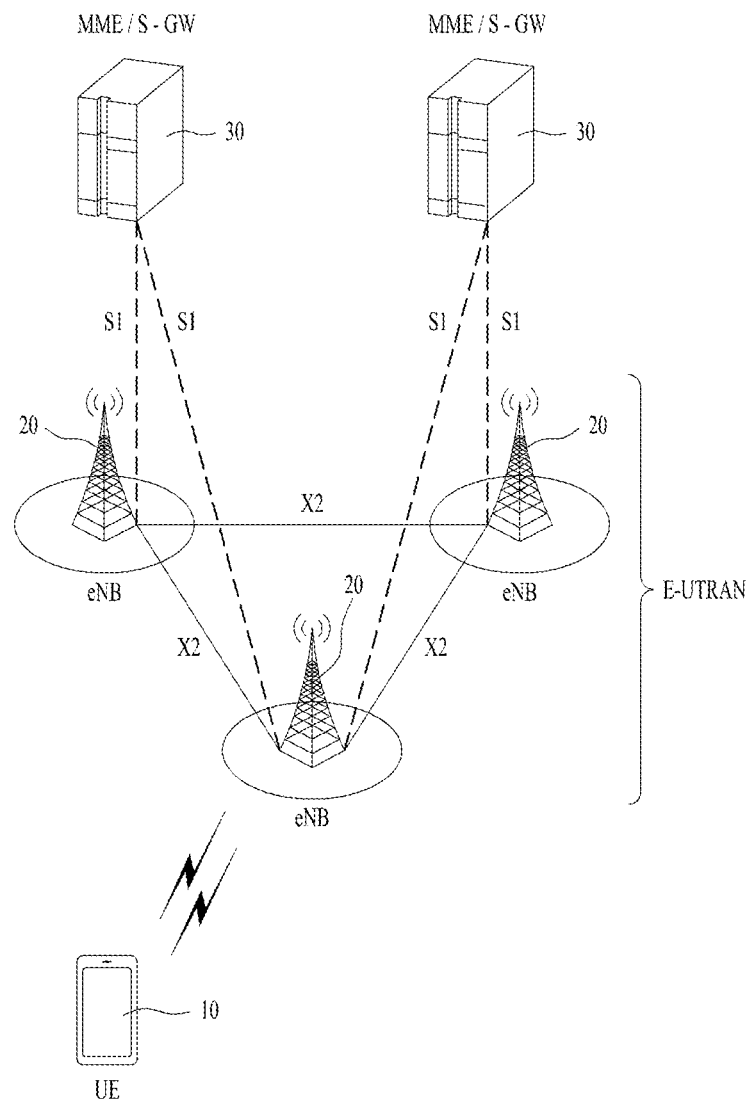
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3A:
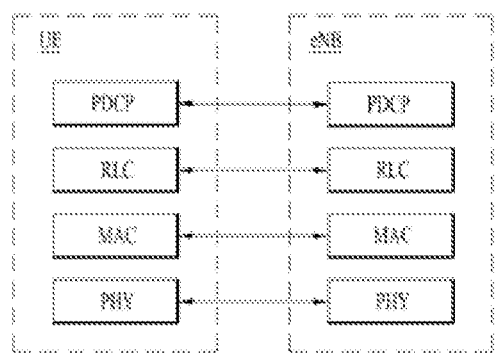
FIGS. 3A and 3B are diagrams illustrating user-plane and control-plane radio protocol architectures according to an embodiment of the present disclosure.

FIG. 3A illustrates a user-plane radio protocol architecture according to an embodiment of the disclosure.

Figure 3B:
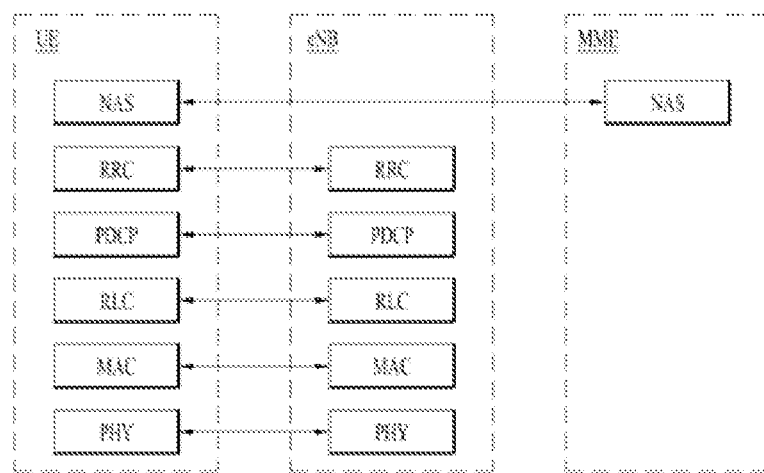

FIG. 3B illustrates a control-plane radio protocol architecture according to an embodiment of the disclosure. A user plane is a protocol stack for user data transmission, and a control plane is a protocol stack for control signal transmission.

Referring to FIGS. 3A and A3, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
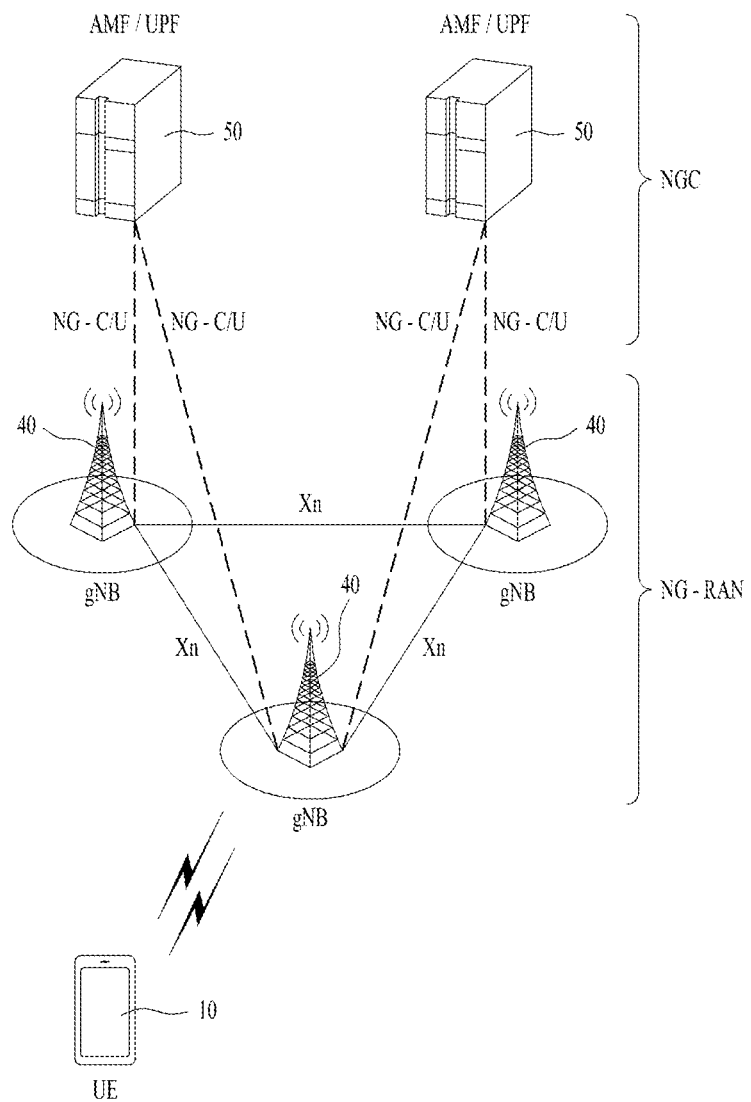
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
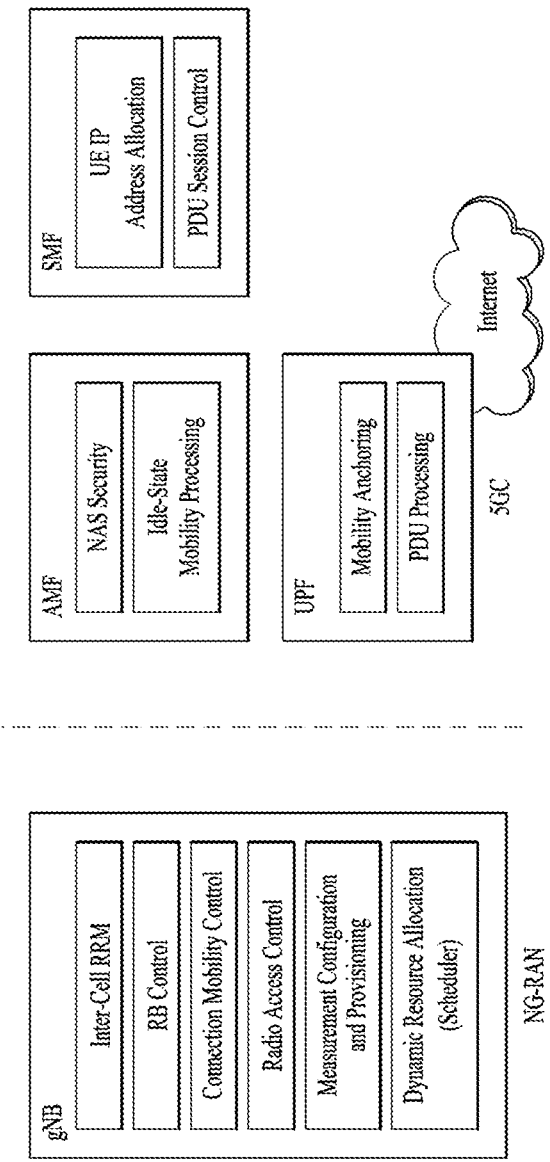
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Now, a description will be given of V2X or sidelink (SL) communication.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

- PSSCH-related and/or PSCCH-related resource allocation information, for example, the positions/number of time/frequency resources, resource reservation information (e.g. a periodicity), and/or
- an SL channel state information (CSI) report request indicator or SL (L1) RSRP (and/or SL (L1) reference signal received quality (RSRQ) and/or SL (L1) received signal strength indicator (RSSI)) report request indicator, and/or
- an SL CSI transmission indicator (on PSSCH) (or SL (L1) RSRP (and/or SL (L1) RSRQ and/or SL (L1) RSSI) information transmission indicator), and/or
- MCS information, and/or
- transmission power information, and/or
- L1 destination ID information and/or L1 source ID information, and/or
- SL HARQ process ID information, and/or
- new data indicator (NDI) information, and/or
- redundancy version (RV) information, and/or
- QoS information (related to transmission traffic/packet), for example, priority information, and/or
- An SL CSI-RS transmission indicator or information about the number of SL CSI-RS antenna ports (to be transmitted);
- Location information about a transmitting UE or location (or distance area) information about a target receiving UE (requested to transmit an SL HARQ feedback), and/or
- RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 6A:
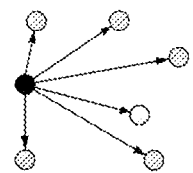
FIGS. 6A to 6C are diagrams illustrating three cast types according to an embodiment of the present disclosure.
Figure 6B:
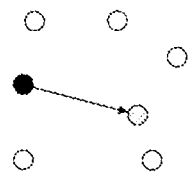
Figure 6C:
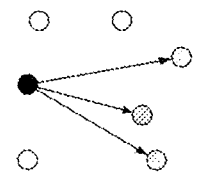

FIGS. 6A to 6C illustrate three cast types according to an embodiment of the present disclosure.

Specifically, FIG. 6A illustrates broadcast-type SL communication, FIG. 6B illustrates unicast-type SL communication, and FIG. 6C illustrates groupcast-type SL communication. In unicast-type SL communication, a UE may perform one-to-one communication with another UE. In groupcast-type SL communication, the UE may perform SL communication with one or more UEs of a group to which the UE belongs. In various embodiments of the present disclosure, SL groupcast communication may be replaced with SL multicast communication, SL one-to-many communication, and so on.

Now, RRC connection establishment between UEs will be described.

For V2X or SL communication, a transmitting UE may need to establish a (PC5) RRC connection with a receiving UE. For example, a UE may obtain a V2X-specific SIB. For a UE with data to be transmitted, which is configured with V2X or SL transmission by a higher layer, when at least a frequency configured for transmission of the UE for SL communication is included in the V2X-specific SIB, the UE may establish an RRC connection with another UE without including a transmission resource pool for the frequency. For example, once the RRC connection is established between the transmitting UE and the receiving UE, the transmitting UE may perform unicast communication with the receiving UE via the established RRC connection.

When the RRC connection is established between the UEs, the transmitting UE may transmit an RRC message to the receiving UE.

EMBODIMENTS

Release 17 NR V2X supports a sidelink (SL) discontinuous reception (DRX) operation of a UE. When the DRX operation of the V2X UE is supported, the following problem may occur.

Despite the absence of a PC5 RRC connection established between V2X UEs, the V2X UEs may transmit and receive a connectionless groupcast message and/or a broadcast message. However, when the UEs operate in a DRX mode, a receiving (RX) UE may fail to receive a message from a transmitting (TX) UE unless the TX UE transmits the message in a DRX On-Duration of the RX UE. This is because without any PC5 RRC connection between the TX UE and the RX UE, there is no way to share DRX configurations between the UEs and thus each UE has no knowledge of the DRX configuration of the other UE. That is, the TX UE may transmit a message outside the DRX On-Duration of the RX UE.

In other words, information about the DRX configurations of the UEs is conventionally transmitted in a PC5 RRC connected state. Accordingly, when the TX UE transmits a message to the RX UE before a PC5 RRC connection is established, the TX UE may transmit the message outside the DRX On-Duration of the RX UE.

In this context, the present disclosure provides a method and apparatus for enabling a TX UE to obtain the DRX configuration of an RX UE in a communication situation in which no PC5 RRC connection is established between the TX UE and the RX UE. According to the method disclosed in the disclosure, the TX UE may transmit a groupcast/broadcast message in the DRX On-Duration of the RX UE despite no connection between the UEs.

Various proposals described below may be applied independently or one or more of them may be applied in combination.

1. Embodiment 1

According to an embodiment of the present disclosure, it is proposed that a UE supporting DRX broadcasts its own SL DRX configuration (a DRX configuration for PSCCH or SCI monitoring) to a neighboring UE on a sidelink broadcast channel (SL BCH).

For example, the UE may broadcast the SL DRX configuration to the neighboring UE by an initial PC5-S broadcast message (i.e., PC5-S Direct Communication Request). When the UE broadcasts the SL DRX configuration by the PC5-S Direct Communication Request, the UE receiving the PC5-S Direct Communication Request may only obtain the SL DRX configuration of the UE without transmitting a response (i.e., PC5-S Direct Communication Accept) to the PC5-S Direct Communication Request. When the UE responds to the PC5-S Direct Communication Request, a PC5 unicast connection may be established. Therefore, the UE may obtain only DRX information without transmitting a response.

The SL DRX configuration transmitted on the SL BCH may include information of Table 1.

TABLE 1

Sidelink DRX configurations

SL drx-onDurationTimer: the duration at the beginning of a DRX Cycle;
SL drx-SlotOffset: the delay before starting the drx-onDurationTimer;
SL drx-InactivityTimer: the duration after the PSCCH occasion in which a PDCCH indicates a new UL or DL transmission for the MAC entity;
SL drx-RetransmissionTimer (per HARQ process): the maximum duration until a retransmission is received;
SL drx-LongCycleStartOffset: the Long DRX cycle and drx-StartOffset which defines the subframe where the Long and Short DRX Cycle starts;
SL drx-ShortCycle (optional): the Short DRX cycle;
SL drx-ShortCycle Timer (optional): the duration the UE shall follow the Short DRX cycle;
SL drx-HARQ-RTT-Timer (per HARQ process): the minimum duration before a assignment for HARQ retransmission is expected by the MAC entity;

The UE may obtain SL DRX configuration information about a neighboring UE by receiving an SL BCH from the neighboring UE. Therefore, the TX UE may obtain the SL DRX configuration of the RX UE without establishing a PC5 RRC connection with the RX UE, and thus transmit a groupcast message and/or a broadcast message in the SL DRX On-Duration of the RX UE.

Figure 7:
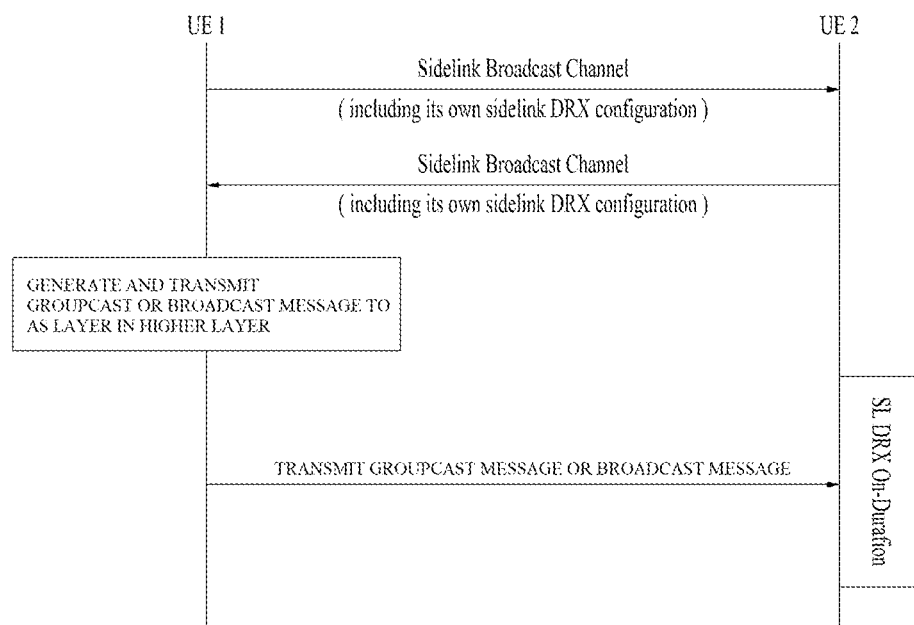
FIGS. 7 to 13 are diagrams for explaining embodiment(s)

FIG. 7 is a diagram illustrating an embodiment of the present disclosure.

Referring to FIG. 7, UE2 may transmit a message including its own SL DRX configuration to UE1 on an SL BCH. UE1 may transmit a groupcast message and/or a broadcast message in the SL DRX On-Duration of UE2 based on the SL DRX configuration of UE2, without a PC5 RRC connection with UE2.

2. Embodiment 2

According to an embodiment of the present disclosure, a UE supporting DRX may transmit its own SL DRX configuration (a DRX configuration for PSCCH or SCI monitoring) to a neighboring UE on a PSCCH (by second SCI).

The SL DRX configuration transmitted by the second SCI may include information described in Table 2.

TABLE 2

Sidelink DRX configurations

SL drx-onDurationTimer: the duration at the beginning of a DRX Cycle;
SL drx-SlotOffset: the delay before starting the drx-onDurationTimer;
SL drx-Inactivity Timer: the duration after the PSCCH occasion in which a PDCCH indicates a new UL or DL transmission for the MAC entity;
SL drx-RetransmissionTimer (per HARQ process): the maximum duration until a retransmission is received;
SL drx-LongCycleStartOffset: the Long DRX cycle and drx-StartOffset which defines the subframe where the Long and Short DRX Cycle starts;
SL drx-ShortCycle (optional): the Short DRX cycle;
SL drx-ShortCycleTimer (optional): the duration the UE shall follow the Short DRX cycle;
SL drx-HARQ-RTT-Timer (per HARQ process): the minimum duration before a assignment for HARQ retransmission is expected by the MAC entity;

For example, when the SL DRX configuration is transmitted in the second SCI, a destination ID included in the SCI may be a groupcast destination layer 1 ID (i.e., some bits of a 24-bit groupcast destination layer 2 ID) extracted from the 24-bit groupcast destination layer 2 ID. The SL DRX configuration may further include a source layer 1 ID extracted from a source layer 2 ID of the TX UE.

Alternatively, when the SL DRX configuration is transmitted in the second SCI, the destination ID included in the SCI may be a broadcast destination layer 1 ID (i.e., some bits of a 24-bit broadcast destination layer 2 ID) extracted from the 24-bit broadcast destination layer 2 ID. The SL DRX configuration may further include the source layer 1 ID extracted from the source layer 2 ID of the TX UE.

For example, when SL DRX configuration information is included in the second SCI, first SCN may indicate whether the second SCI includes the SL DRX configuration information by an SL DRX Configuration bit. For example, it may be indicated whether the second SCI includes the SL DRX configuration information by a reserved bit of the first SCI. For example, when the SL DRX Configuration bit is set to 0, it may indicate that the second SCI does not include the SL DRX configuration information. When the SL DRX Configuration bit is set to 1, it may indicate that the second SCI includes the SL DRX configuration information.

In this case, a Release 16 legacy UE (i.e., a UE that does not support SL DRX) may perform a conventional SCI decoding procedure, understanding the SL DRX Configuration bit as a reserved bit. On the contrary, a Release 17 legacy UE (i.e., a UE supporting SL DRX) may identify whether the second SCI includes the SL DRX Configuration from the SL DRX Configuration bit of the first SCI. For example, when the SL DRX Configuration bit is set to 0, it may indicate that the second SCI does not include the SL DRX configuration information. When the SL DRX Configuration bit is set to 1, it may indicate that the second SCI includes the SL DRX configuration information or the SL DRX configuration is delivered on a PSSCH associated with the SCI.

Further, when the second SCI does not include the whole SL DRX configuration information, the remaining SL DRX configuration information may be included in a PSSCH associated with the transmitted second SCI. For this purpose, the second SCI may include a "More Sidelink DRX Configuration Bit".

For example, when the "More Sidelink DRX Configuration Bit" included in the second SCI is set to 0, this may imply that the whole SL DRX configuration information is transmitted in the second SCI. When the "More Sidelink DRX Configuration Bit" included in the second SCI is set to 1, this may imply that the whole SL DRX configuration information is not transmitted in the second SCI and thus the remaining SL DRX configuration information is transmitted on the PSSCH. Alternatively, when the "More Sidelink DRX Configuration Bit" i is set to 0, this may imply that the second SCI does not have a sufficient space for the SL DRX configuration information and thus the whole SL DRX configuration information may be transmitted on the PSSCH associated with the second SCI.

Figure 8:
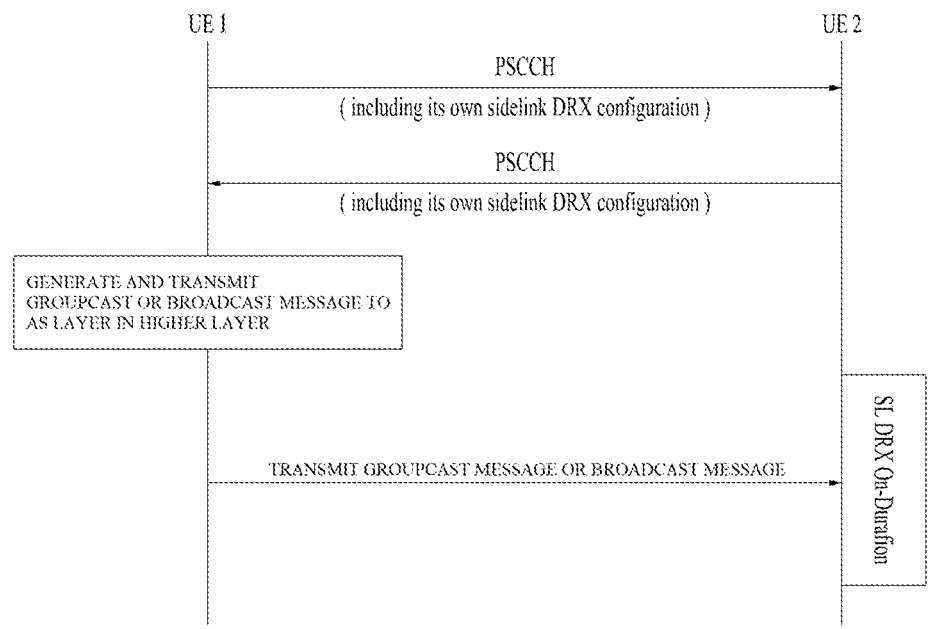

FIG. 8 is a diagram illustrating an embodiment of the present disclosure.

Referring to FIG. 8, UE2 may transmit a message including its own SL DRX configuration to UE1 on a PSCCH. For example, the SL DRX configuration may be transmitted in second SCI. UE1 may transmit a groupcast message and/or a broadcast message in the SL DRX On-Duration of UE2 based on the SL DRX configuration of UE2 without a PC5 RRC connection with UE2.

3. Embodiment 3

According to an embodiment of the present disclosure, it is proposed that a UE supporting DRX broadcasts its own SL DRX configuration (a DRX configuration for PSCCH or SCI monitoring) to a neighboring UE on a PSSCH (as groupcast data or broadcast data). The SL DRX configuration transmitted on the PSSCH may include information described in Table 3.

TABLE 3

Sidelink DRX configurations

SL drx-onDurationTimer: the duration at the beginning of a DRX Cycle;
SL drx-SlotOffset: the delay before starting the drx-onDurationTimer;
SL drx-InactivityTimer: the duration after the PSCCH occasion in which a PDCCH indicates a new UL or DL transmission for the MAC entity;
SL drx-RetransmissonTimer (per HARQ process): the maximum duration until a retransmission is received;
SL drx-LongCycleStartOffset: the Long DRX cycle and drx-StartOffset which defines the subframe where the Long and Short DRX Cycle starts;
SL drx-ShortCycle (optional): the Short DRX cycle;
SL drx-ShortCycleTimer (optional): the duration the UE shall follow the Short DRX cycle;
SL drx-HARQ-RTT-Timer (per HARQ process): the minimum duration before a assignment for HARQ retransmission is expected by the MAC entity;

When the DL DRX configuration is transmitted on the PSSCH, a destination ID included in the PSSCH message may be a groupcast destination layer 2 ID. In addition, the source layer 2 ID of the TX UE may also be included in the PSSCH message.

Further, when the SL DRX configuration is transmitted on the PSSCH, the destination ID included in the PSSCH message may be a broadcast destination layer 2 ID. In addition, the source layer 2 ID of the TX UE may also be included in the PSSCH message.

Figure 9:
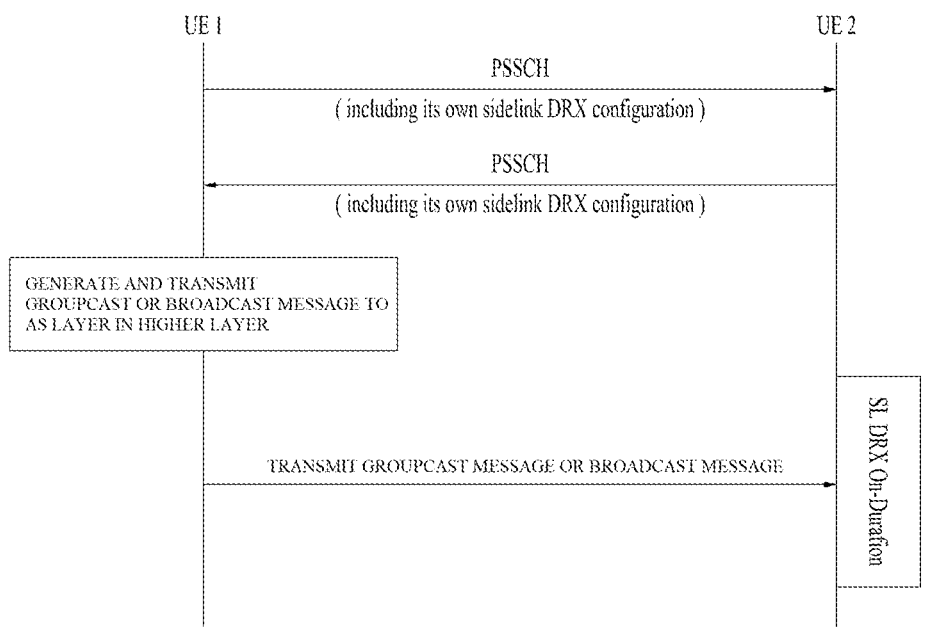

FIG. 9 is a diagram illustrating an embodiment of the present disclosure.

Referring to FIG. 9, UE2 may transmit a message including its own SL DRX configuration to UE1 on a PSSCH. A UE may obtain SL DRX information about a neighboring UE by receiving a groupcast and/or broadcast PSSCH from the neighboring UE. UE1 may transmit a groupcast message and/or a broadcast message in the SL DRX On-Duration of UE2 based on the SL DRX configuration of UE2 without a PC5 RRC connection with UE2.

4. Embodiment 4

According to an embodiment of the disclosure, it is proposed that a TX UE may derive the SL DRX configuration of the other RX UE based on the location area/zone in which the RX UE is located and transmit a groupcast message and/or a broadcast message in the SL DRX On-Duration of the RX UE.

Conventionally, the location area of a UE, Zone ID may be mapped to an SL DRX configuration. That is, conventionally, UEs located in a similar location area may operate SL DRX with the same SL DRX configuration.

Upon generation of a connectionless groupcast message and/or broadcast message from a higher layer, the TX UE obtains an SL DRX configuration based on its location area (e.g., Zone ID). The TX UE may transmit the connectionless groupcast message and/or broadcast message in an obtained SL DRX On-Duration. In this manner, even though a PC5 RRC connection is not established between the TX UE and a neighboring RX UE, the neighboring RX UE located in the vicinity of the TX UE may receive the groupcast message or broadcast message from the TX UE in the SL DRX On-Duration of the RX UE.

5. Embodiment 5

A V2X UE may have a plurality of V2X service types (e.g., provider service identifiers (PSIDs) or intelligent transport systems-application object identifiers (ITS-AIDs), and each of the plurality of V2X service types may haves a different service requirement or a different QoS requirement for a service (e.g., PC5 QoS ID (PQI): PC5 5QI). A V2X UE to which DRX is applied needs to generate an SL DRX configuration by combining/considering service requirements corresponding to a plurality of service types.

When a BS generates an SL DRX configuration, the UE should transmit service requirement information corresponding to the plurality of service types to the BS. The BS should generate an SL DRX configuration based on the received service requirement information and transmit the SL DRX configuration to the UE. Although the BS generates a DRX configuration and transmits the DRX configuration to the UE in conventional Uu communication as described above, use of this operation for V2X communication may cause unnecessary signaling overhead.

According to an embodiment of the present disclosure, the V2X UE may generate an SL DRX configuration by using application information without signaling with the BS. Therefore, the V2X UE may reduce signaling overhead with the BS.

Figure 10:
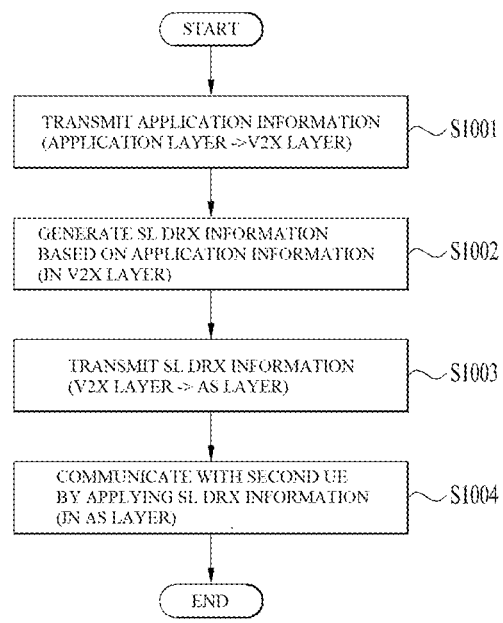

FIG. 10 is a diagram illustrating an embodiment of the present specification.

Referring to FIG. 10, in step S1001, application information may be transmitted from a V2X application layer of a UE to a V2X layer of the UE. The application information may specify a service type (e.g., a PSID or an ITS-AID) and/or a V2X application requirement. For example, the application requirement may be a QoS requirement (e.g., PQI: PC5 5QI). There may be a plurality of service types, and V2X application requirements may correspond to the respective service types. The V2X layer of the UE may receive application requirements corresponding to the respective service types from the application layer.

In step S1002, the UE may generate an SL DRX configuration based on the service type and the V2X application requirement in the V2X layer. That is, the V2X layer of the UE may generate the SL DRX configuration by combining/considering the received service type and application requirement information.

In step S1003, the UE may deliver the generated SL DRX configuration from the V2X layer to an access stratum (AS) layer.

In step S1004, the AS layer of the UE may perform SL communication with other UEs based on the received SL DRX configuration.

SL DRX information may include at least one of SL drx-onDurationTimer, SL drx-SlotOffset, SL drx-InactivityTimer, SL drx-RetransmissionTimer, SL drx-LongCycleStartOffset, SL drx-ShortCycle, SL drx-ShortCycleTimer, or SL drx-HARQ-RTT-Timer.

Figure 11:
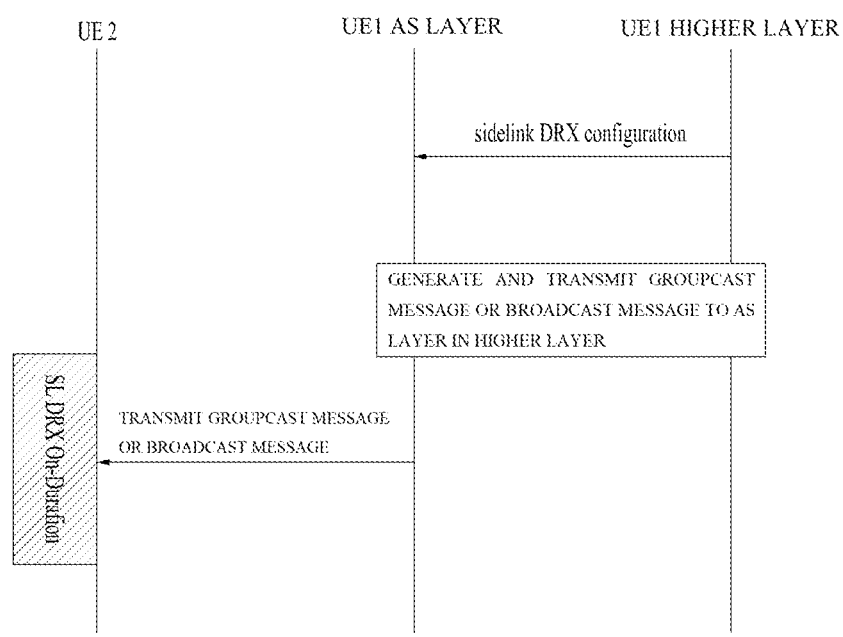

FIG. 11 is a diagram illustrating an embodiment of the present disclosure.

Referring to FIG. 11, a higher layer (i.e., the V2X layer) of a UE may generate an SL DRX configuration and transmit the SL DRX configuration to the AS layer of the UE. The UE may transmit a groupcast message and/or a broadcast message to another UE by using the SL DRX configuration.

In other words, the V2X layer of the UE may generate the SL DRX configuration and transmit the SL DRX configuration to the AS layer based on application information and/or a V2X application requirement transmitted from a V2X application layer of the UE to the V2X layer. The application information may include service type(s) (e.g., a PSID or ITS-AID).

The UE may generate the SL DRX configuration mapped to a groupcast/broadcast L2 ID in the V2X layer and transmit the SL DRX configuration to the AS layer. The TX UE may transmit a connectionless groupcast/broadcast message in the SL DRX On-Duration of an RX UE based on the SL DRX configuration mapped to the groupcast/broadcast service received from the V2X layer.

6. Embodiment 6

Figure 12:
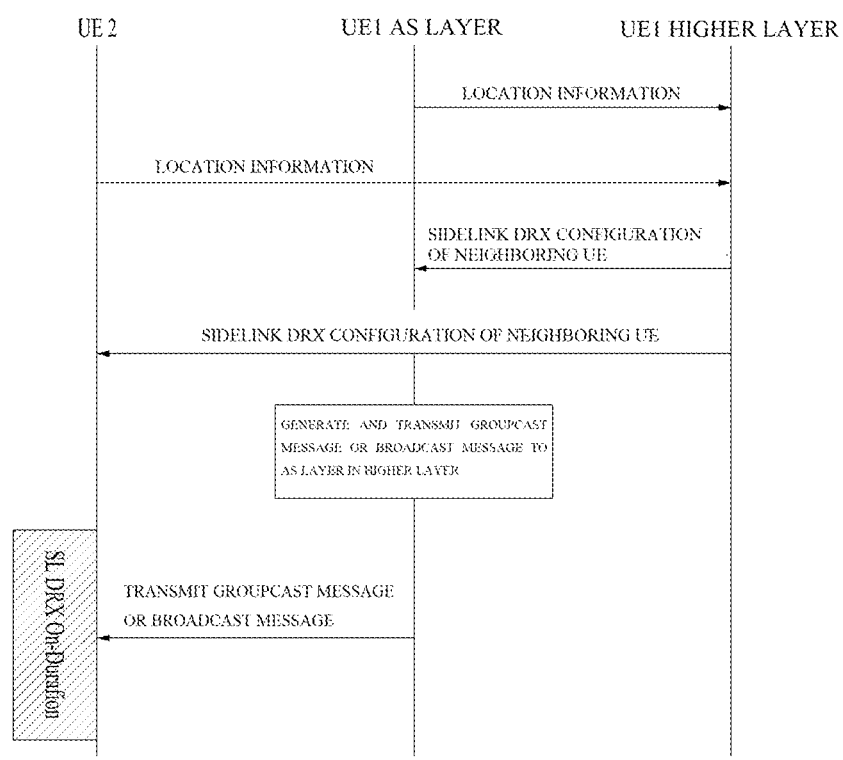
Figure 13:
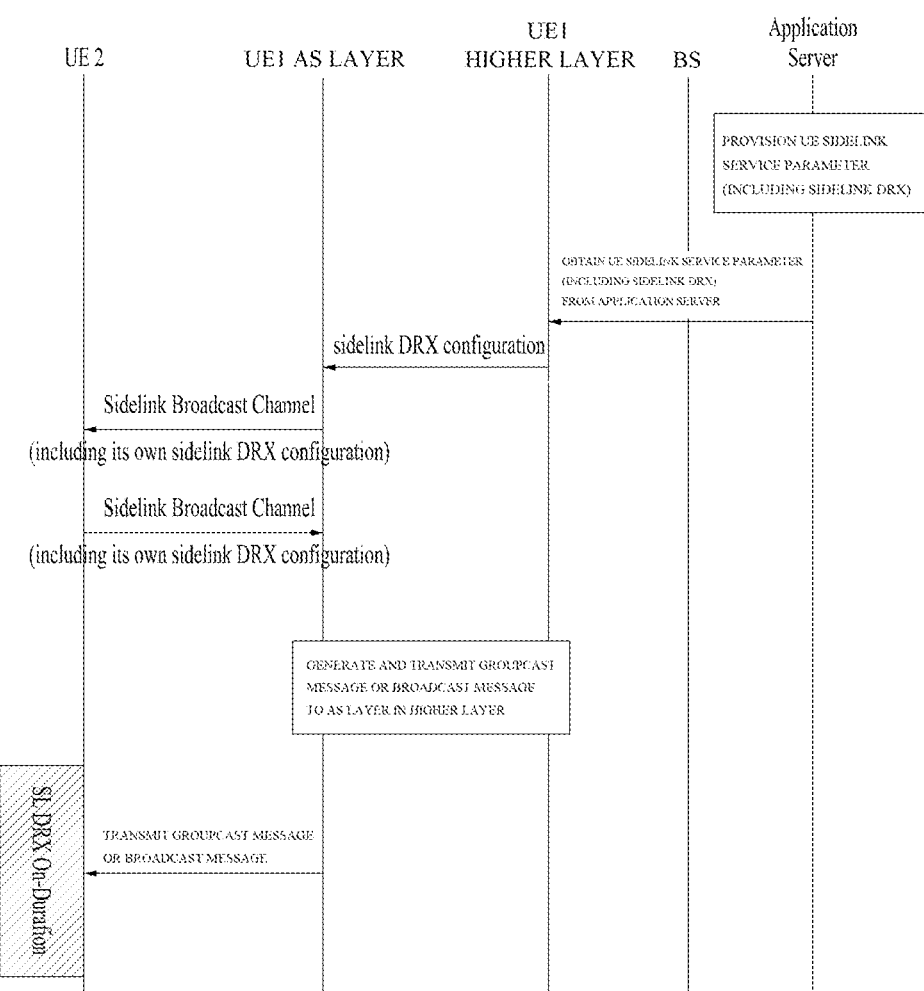

FIG. 12 is a diagram illustrating an embodiment of the present disclosure.

Referring to FIG. 12, when a UE initiates SL communication, the UE may transit its location information (absolute location information, relative location information, or a Zone ID), a groupcast/broadcast destination L2 ID, and an SL DRX configuration to a BS by SL UE information. Thus, the BS may obtain location information about in-coverage UE(s) that has transmitted SL UE information, a groupcast/broadcast Destination L2 ID, and an SL DRX configuration. When the BS allocates a radio resource configuration required for SL communication to the UE that has transmitted the SL UE information, the BS may transmit groupcast/ broadcast destination L2 IDs and SL DRX configurations of neighboring UEs in the radio resource configuration to the UE. The UE may transmit a connectionless groupcast/broadcast message in the SL DRX On-Duration of a target RX UE based on the SL DRX configurations of its neighboring UEs included in the radio resource configuration required for SL communication received from the BS.

7. Embodiment 7

FIG. 11 is a diagram illustrating an embodiment of the present disclosure.

Referring to FIG. 11, a V2X application server may manage the SL DRX configuration of a UE through provisioning for each application service of the UE. Provisioning may mean allocating, disposing, and distributing information or resources according to user needs, and preparing them in advance in a state where they may be used immediately when necessary. That is, the V2X application server may map an SL application service of the UE to the SL DRX configuration and manage them as a service parameter (including the DRX configuration). The V2X application layer of the UE may receive its service parameter (including the DRX configuration) from the V2X application server.

The UE broadcasts its SL DRX configuration on an SBCCH (an initial PC5-S broadcast message (i.e., PC5-S Direct Communication Request)) so that a neighboring UE may obtain the SL DRX configuration of the UE. Thus, the UE may obtain the SL DRX configuration of the neighboring UE. The TX UE may transmit a connectionless groupcast/broadcast message in the SL DRX On-Duration of the RX UE based on the obtained SL DRX configuration.

According to various embodiments of the present disclosure, when each UE operating in SL DRX transmits connectionless groupcast traffic and broadcast traffic to a target UE, the UE may obtain SL DRX configuration information about the target UE without establishing a PC5 RRC connection with the target UE. Therefore, the TX UE may transmit connectionless groupcast traffic and broadcast traffic in the SL On-Duration section of the RX UE.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
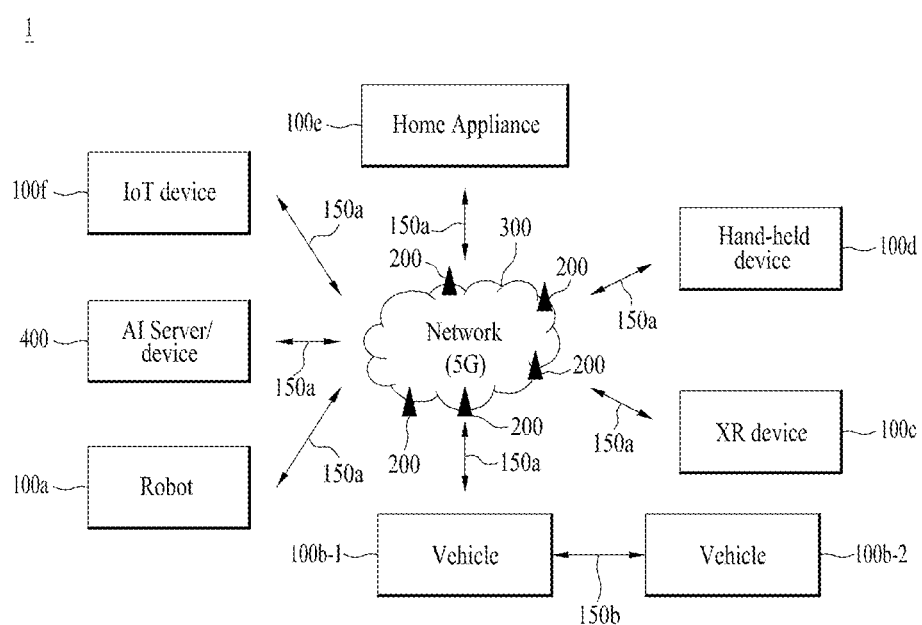
FIGS. 14 to 23 are block diagrams illustrating various devices applicable to embodiment(s) of the present disclosure.

FIG. 14 illustrates a communication system applied to the present disclosure.

Referring to FIG. 14, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 15:
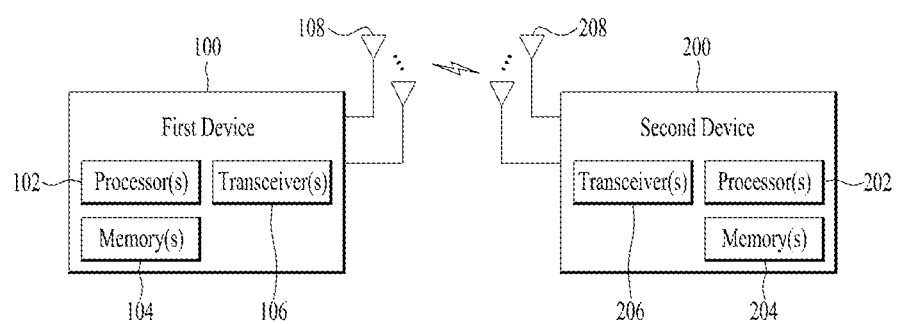

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

The wireless communication technology implemented in the wireless devices 100 and 200 of the present disclosure may include a narrowband Internet of Things for low-power communication as well as LTE, NR, and 6G. For example, NB-IoT may be an example of low power wide area network (LPWAN) and implemented as standards such as LTE Cat NB1 and/or LTE Cat NB2, not limited to these names. Additionally or alternatively, the wireless communication technology implemented in the wireless devices 100 and 200 of the present disclosure may perform communication in LTE-M. In this case, for example, LTE-M may be an example of LPWAN and called by various names such as enhanced machine type communication (eMTC). For example, LTE-M may be implemented as at least one of 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, not limited to these names. Additionally or alternatively, the wireless communication technology implemented in the wireless devices 100 and 200 of the present disclosure may include at least one of ZigBee, Bluetooth, or LPWAN in consideration of low power communication, not limited to these names. For example, ZigBee may generate a personal area network (PAN) related to small/low-power digital communication based on various standards such as IEEE 802.15.4, and may be called by various names.

Example of a Signal Process Circuit to which the Present Disclosure is Applied

Figure 16:
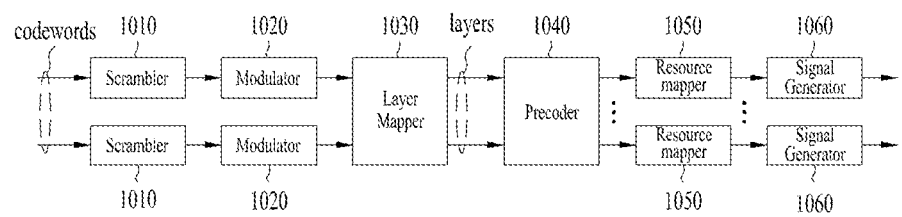

FIG. 16 illustrates a signal process circuit for a transmission signal.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
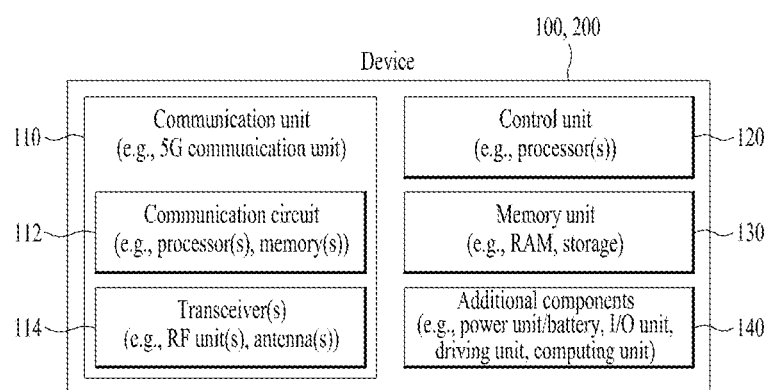

Application Example of a Wireless Device to which the Present Disclosure is Applied FIG. 17 illustrates another example of a wireless device applied to the present disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Example of Hand-Held Device to which the Present Disclosure is Applied

Figure 18:
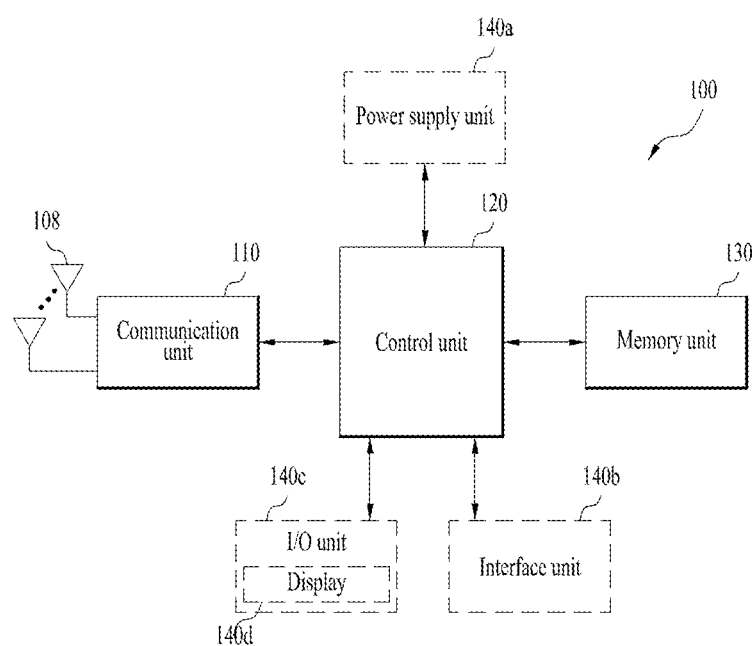

FIG. 18 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 19:
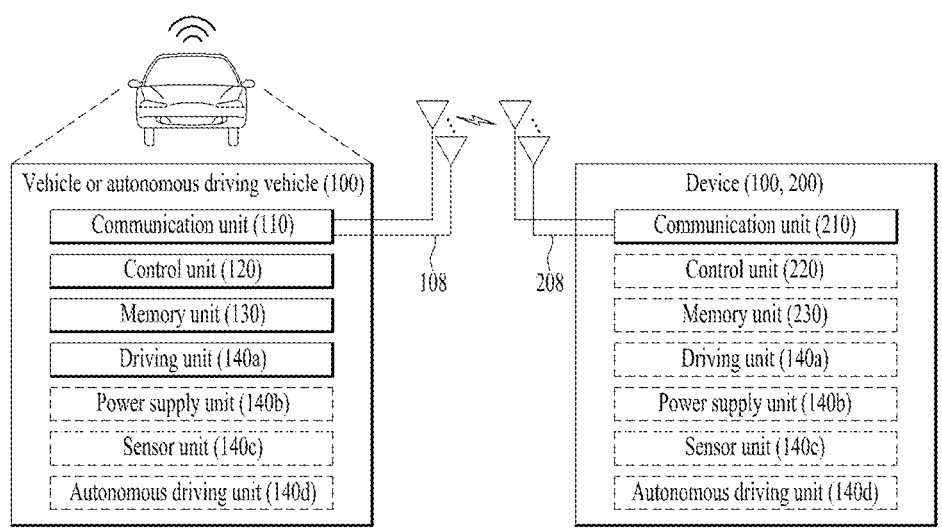

Example of a Vehicle or an Autonomous Driving Vehicle to which the Present Disclosure is Applied FIG. 19 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 20:
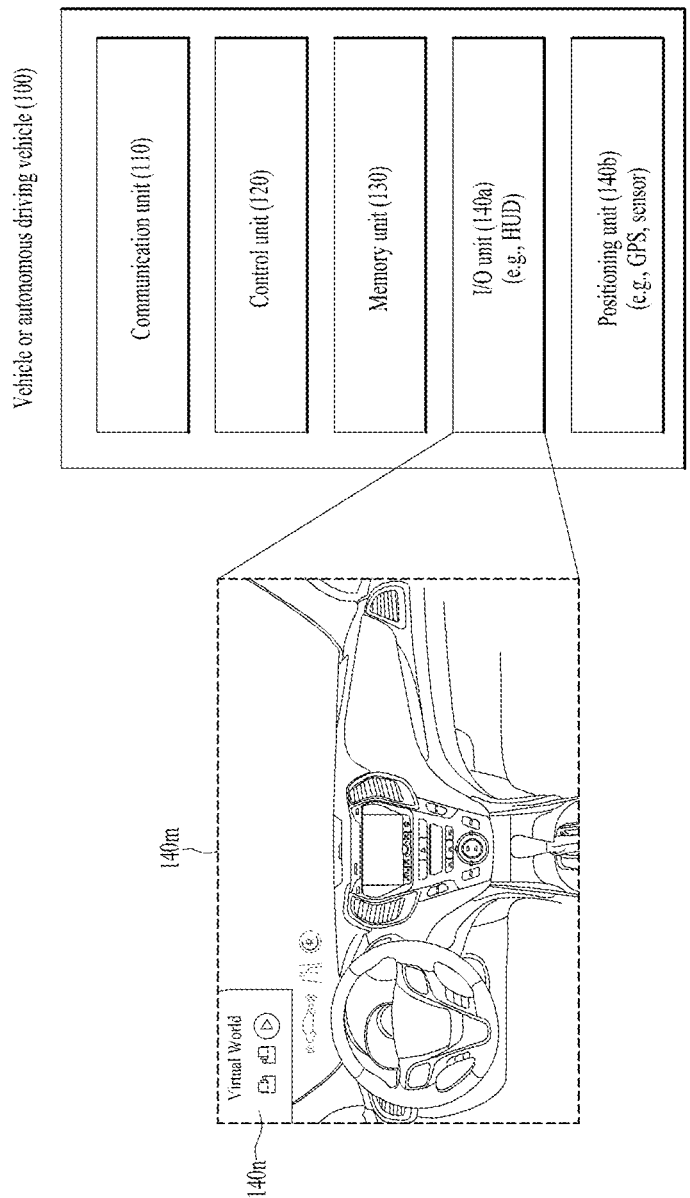

FIG. 20 illustrates a vehicle applied to the present disclosure. The vehicle may be implemented as a transport means, an aerial vehicle, a ship, etc.

Referring to FIG. 20, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 17.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of XR Device to which the Present Disclosure is Applied

Figure 21:
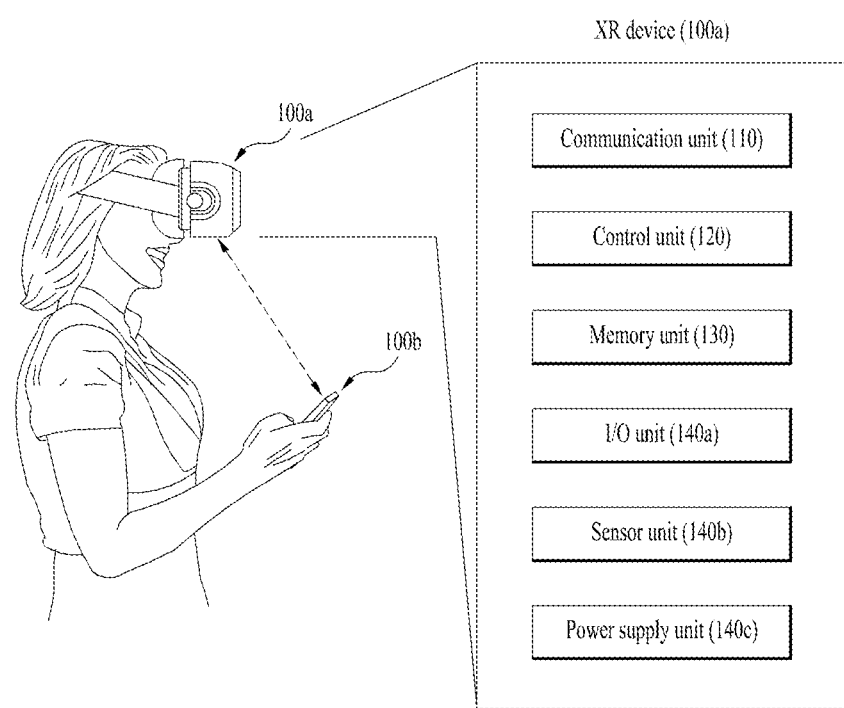

FIG. 21 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 21, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 17, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of Robot to which the Present Disclosure is Applied

Figure 22:
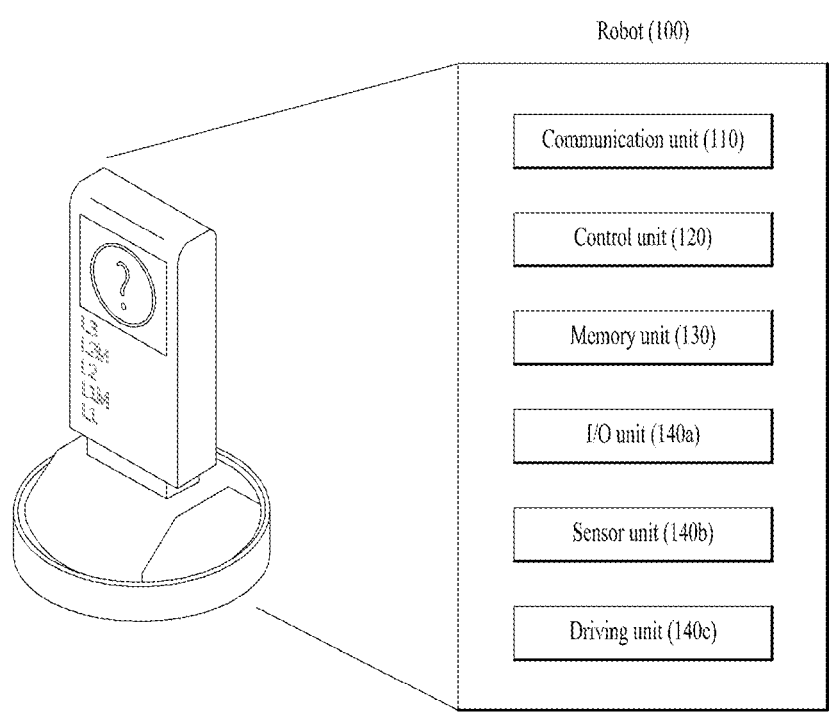

FIG. 22 illustrates a robot applied to the present disclosure. The robot may be categorized into an industrial robot, a medical robot, a household robot, a military robot, etc., according to a used purpose or field.

Referring to FIG. 22, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 17, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Examples of AI Device to which the Present Disclosure is Applied

Figure 23:
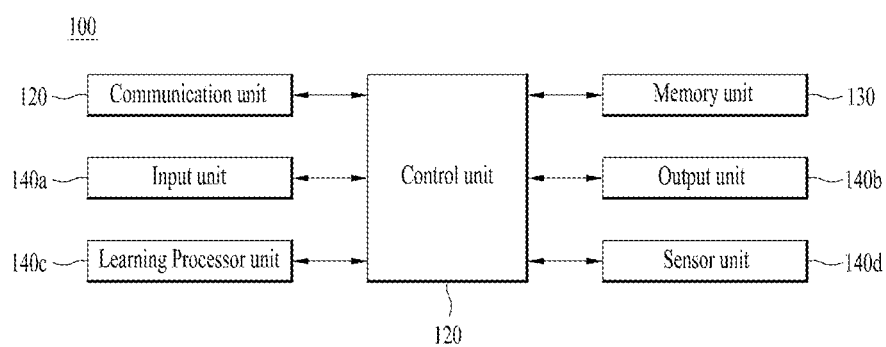

FIG. 23 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 23, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 17, respectively.

The communication unit 110 may transmit and receive wired/radio signals (e.g., sensor information, user input, learning models, or control signals) to and from external devices such as other AI devices (e.g., 100x, 200, or 400 of FIG. 14) or an AI server (e.g., 400 of FIG. 14) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 14). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 14). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The above-described embodiments of the present disclosure are applicable to various mobile communication systems.

What is claimed is:

1. A method for a first user equipment (UE) operating in a wireless communication system, the method comprising:
    determining a service type identified based on an intelligent transport systems-application object identifier (ITS-AID) or a provider service identifier (PSID);
    configuring sidelink (SL) discontinuous reception (DRX) for groupcast based on the service type and a layer-2 identifier; and
    monitoring first sidelink control information (SCI) based on the SL DRX,
    wherein the SL DRX is configured with parameters including SL drx-onDurationTimer, SL drx-InactivityTimer, SL drx-RetransmissionTimer and SL drx-HARQ-RTT-Timer.

2. The method according to claim 1, wherein the parameters further includes at least one of SL drx-SlotOffset, SL drx-LongCycleStartOffset, SL drx-ShortCycle, SL drx-ShortCycleTimer.

3. The method according to claim 1, wherein the SL DRX is transmitted to other UEs which are not connected to the first UE.

4. The method according to claim 1, wherein the SL DRX is transmitted to a second UE through a physical sidelink broadcast channel (PSBCH).

5. The method according to claim 1, wherein the SL DRX is transmitted to a second UE through second sidelink control information (SCI).

6. The method according to claim 5, wherein first SCI includes an indicator indicating whether the SL DRX is included in the second SCI.

7. The method according to claim 5, wherein based on a part of the SL DRX being included in the second SCI, remaining SL DRX is transmitted to the second UE through a physical sidelink shared channel (PSSCH).

8. The method according to claim 7, wherein the second SCI includes an indicator indicating whether the remaining SL DRX is included in the PSSCH.

9. The method according to claim 1, wherein the SL DRX is transmitted to a second UE through a PSSCH.

10. A first user equipment (UE) configured to operate in a wireless communication system, the first UE comprising:
    at least one processor; and
    at least one computer memory operably coupled to the at least one processor and storing instructions which when executed, cause the at least one processor to perform operations,
    wherein the operations include:
    determining a service type identified based on an intelligent transport systems-application object identifier (ITS-AID) or a provider service identifier (PSID);
    configuring sidelink (SL) discontinuous reception (DRX) for groupcast based on the service type and a layer-2 identifier; and
    monitoring first sidelink control information (SCI) based on the SL DRX,
    wherein the SL DRX is configured with parameters including SL drx-onDurationTimer, SL drx-InactivityTimer, SL drx-RetransmissionTimer and SL drx-HARQ-RTT-Timer.

11. A processor for performing operations for a first user equipment (UE) configured to operate in a wireless communication system,
    wherein the operations include:
    determining service type identified based on an intelligent transport systems-application object identifier (ITS-AID) or a provider service identifier (PSID);
    configuring sidelink (SL) discontinuous reception (DRX) for groupcast based on the service type and a layer-2 identifier; and
    monitoring first sidelink control information (SCI) based on the SL DRX,
    wherein the SL DRX is configured with parameters including SL drx-onDurationTimer, SL drx-InactivityTimer, SL drx-RetransmissionTimer and SL drx-HARQ-RTT-Timer.

12. The first UE according to claim 10, wherein the first UE communicates with at least one of another UE, a UE related to an autonomous driving vehicle, a base station, or a network.

* * * * *